US006648240B2

(12) United States Patent

Simmons

(10) Patent No.: US 6,648,240 B2
(45) Date of Patent: Nov. 18, 2003

(54) APPARATUS TO CONTROL FLUID FLOW RATES

(75) Inventor: Philip Andrew Simmons, Alcester (GB)

(73) Assignee: IMI Cornelius Inc., Anoka, MN (US)

( * ) Notice: Subject to any disclaimer, the term of this patent is extended or adjusted under 35 U.S.C. 154(b) by 36 days.

(21) Appl. No.: 09/870,297

(22) Filed: May 30, 2001

(65) Prior Publication Data

US 2002/0008163 A1 Jan. 24, 2002

(30) Foreign Application Priority Data

Jun. 1, 2000 (GB) ............................................ 0013174

(51) Int. Cl.[7] ........................ A01G 27/00; A02C 13/02; A02C 31/00; B05B 7/10

(52) U.S. Cl. ........................... 239/63; 239/67; 239/302; 239/398; 239/399; 239/406

(58) Field of Search ............................. 239/63, 67, 68, 239/69, 74, 302, 303, 304, 398, 399, 406, 410, 412, 418, 569, 570; 222/129.1, 129.2, 129.3, 129.4, 145.5, 504, 59, 63

(56) References Cited

U.S. PATENT DOCUMENTS 4,143,255 A * 3/1979 Herscovitz ................. 200/81.9
4,846,234 A * 7/1989 Rudick ......................... 141/98
4,930,555 A * 6/1990 Rudick ......................... 141/98
4,979,639 A * 12/1990 Hoover et al. .................. 222/1
6,450,369 B1 * 9/2002 Heyes ..................... 222/129.1

* cited by examiner

*Primary Examiner*—Michael Mar
*Assistant Examiner*—Davis Hwu
(74) *Attorney, Agent, or Firm*—Sten Erik Hakanson

(57) ABSTRACT

Apparatus for mixing two fluids has separate supply lines for delivering the fluids to a mixing head. Flow rate of fluid in one supply line is monitored by arranging a pressure transducer to measure a pressure drop across an orifice in an orifice plate arranged in the supply line and a controller is responsive to the detected flow rate to control flow rate of fluid in the other supply line to achieve a desired flow ratio of both fluids at the mixing head for producing a mixed fluid having the correct proportions of both fluids. The fluids may be a concentrate syrup and a plain or carbonated water to produce a beverage.

4 Claims, 2 Drawing Sheets

APPARATUS TO CONTROL FLUID FLOW RATES

BACKGROUND OF THE INVENTION

This invention relates to an apparatus to control of the flow rates of fluids. It is particularly concerned to provide a means whereby the flow rates of two or more fluids to be mixed are controlled and is especially intended for use in the mixing of the components of a post-mix beverage.

In the dispensing of a post-mix beverage, i.e. in which the components of the beverage are mixed at the point of sale from one or more fluid components, e.g. a concentrated syrup and a diluent, usually plain or carbonated water, it is obviously desirable to provide a mixed beverage of the correct ratio of components and it is important that this ratio should not vary beyond tightly controlled limits. It is, therefore, desirable to have some means of determining the amount of each component being provided to, for example, a dispense nozzle. One way of achieving this is to determine the flow rate of each component, either by direct measurement or by calculation after measurement of another property, and to calculate the amount dispensed from a series of flow rate determinations with respect to elapsed time.

SUMMARY OF THE INVENTION

It is an object of the present invention to provide an improved means of accurately mixing fluids, particularly beverage fluid components, in a desired ratio. It is also an objet of the present invention to provide an improved means of determining fluid flow rate values.

Accordingly the invention herein provides an apparatus for the mixing of at least two fluids, which comprises a first fluid supply line connectable to a source of the first fluid, a second fluid supply line connectable to a source of the second fluid. The invention also includes a mixing head into which the two fluids can be supplied through their respective supply lines and mixed therein and dispensed there from. The first fluid supply line passes through an orifice in an orifice plate and a pressure transducer is positioned to measure the pressure drop in the fluid passing through the plate. The pressure transducer provides the measured pressure data to a controller, the controller being pre-programmed with flow rate values determined over a range of pressure drops for the first fluid and to control the rate of flow of the second fluid to the mixing head in response to the flow rate of the first fluid to achieve a desired flow ratio of the two fluids. The controller may allow flow for a predetermined time dependent on the monitored flow rates in order to achieve a specific volume of dispensed fluids.

As indicated above, the invention is particularly intended for use in the dispensing of post-mix beverages and will, therefore, be more particularly described below with particular reference to that embodiment. The mixing head may conveniently include a dispense nozzle from which the mixed beverage maybe dispensed into a suitable receptacle. The first fluid is preferably a concentrated syrup and the second fluid is preferably a diluent, e.g. plain or carbonated water. The second fluid supply line may contain any suitable flow rate measuring device e.g. a flow turbine, and this is flow rate sensor is also connected to the controller. Thus, the flow rate of the second fluid/diluent may also be monitored in addition to the pressure transducer monitoring of the first fluid/syrup. The controller is also connected to a valve in the second fluid supply line and can cause that valve to be opened to the desired amount to achieve the required flow rate for the dispense ratio for the particular beverage being dispensed.

By monitoring the second fluid rate in conjunction with that of the first fluid rate and, where necessary, adjusting the second fluid flow rate to correspond to any variations in the monitored first fluid flow rate, the ratio of the dispensed beverage can be accurately maintained at the required value. Thus any variations in the flow rate of the concentrate of a post-mix beverage, e.g. due to pressure variations in the supply line or delays in response of the on/off valve through which the concentrate is supplied, can be monitored and taken into account by rapid consequential adjustments to the diluent flow rate.

The concentrate supply line may contain a simple on/off valve to allow the concentrate to flow when a beverage dispense is signalled to the controller. The controller then causes the valve, e.g. a solenoid or diaphragm valve, to open while at the same time, or fractionally earlier, opening the on/off valve in the diluent supply line and commencing monitoring of the two flow rates. In this embodiment, therefore, the concentrate valve is either open or closed and when open it remains fully open to provide a particular nominal flow rate. The valve may have, e.g., a manual adjuster to fine tune this nominal flow rate for particular concentrates. The pressure transducer in this embodiment is essentially, therefore, providing monitoring of flow rate fluctuations above and below the nominal rate through the fully opened valve.

In another embodiment, the on/off valve in the concentrate flow line may be controllable to provide a range of flow rates of the concentrate whereby the controller maybe programmed to control dispense of a wider range of beverages based on a greater number of different concentrates that may be supplied one at a time through the first fluid supply line. In a particular preferred version of this latter embodiment, the valve in the concentrate supply line is of the type described and claimed in our international patent publication WO99/29619 (application no. PCT/GB98/03564). That international application describes and claims a valve comprising a substantially rigid housing containing a passageway between an inlet and an outlet of the valve, a closure member movable in the passageway from a first position in which the valve is fully closed to a second position in which the valve is fully open, the closure member engaging the wall of the passageway to seal the passageway, the wall of the passageway or the closure member defining at least one groove, the groove having a transverse cross-section that increases in area in the downstream or upstream direction, whereby movement of the closure member from the first position towards the second position opens a flow channel through the groove. The groove(s) may be, for example, of tapering V-shape and will, for convenience, hereafter be referred to as "V-grooves" and the valves of this general type as "V-groove valves", although it will be appreciated that the grooves may, if desired, have a different tapering cross-section, e.g. of circular, rectangular or other shape.

The progressive increase or decrease in area of the groove flow channels can produce excellent linear flow through these V-groove valves, i.e. for a given pressure the flow rate is more directly proportional to the valve position than for conventional valves. This enables better control of the flow rate over the entire operating range of the valve. Alternatively the V-groove valve may be replaced, for example, by a solenoid, on/off valve upstream of a needle valve to provide the desired range of concentrate flow rates. The means to open and close the adjustable concentrate valve may be any suitable mechanism. A stepper motor or a linear solenoid actuator are amongst the preferred mechanisms.

The valve to control the flow of diluent may also be, if desired, a V-groove valve. Pressure transducers are well known in the art and the skilled man will readily be able to choose one suitable for his particular needs. Essentially, the pressure transducer measures fluid pressure at a particular point or surface and converts this measurement into an electrical signal. The electrical signal is fed to the control means which, therefore, is programmed to receive the pressure data in this electrical form.

The orifice plate may be positioned upstream or downstream of the on/off valve in the concentrate supply line but it is preferred that it be upstream as this arrangement, although possibly subject to static pressure variations, is less likely to be affected by variations in flow characteristics through the orifice plate. Nevertheless, it may be desirable in certain circumstances to position the orifice plate downstream of the on/off valve and, in one such embodiment, the orifice plate may be positioned immediately before the outlet of the concentrate supply line to the mixing head. In this arrangement the plate can vent to atmosphere and the pressure transducer measures the pressure immediately upstream of the plate. However, it is preferred to measure the pressure difference across the orifice in the plate and this may be done whether the plate is positioned upstream or downstream of the on/off valve. Preferably, the positioning of the orifice plate, when not venting to a atmosphere as described above, in the supply line should be such that the supply line at the downstream side of the plate remains full of the concentrate. Thus the flow line through the plate should preferably be uphill or at least horizontal. By this means there is less likelihood of trapped air affecting the pressure measurements and hence the flow rate values.

It will be appreciated that fluid flow characteristics through the orifice plate are affected inter alia by the size of the orifice, the sharpness of the edge leading into the orifice and the thickness of the plate. In principle, the thinner the plate the better in that the fluid can then effectively be considered to be passing through a very short tube. The shorter the tube the less "re-attachment" effect of the fluid to the wall of the tube and the less undesirable effect on the flow and the flow rate measurement. Clearly too thin a plate may buckle under the fluid pressure and we have, therefore, found, that as an alternative to a very sharp orifice edge on a slightly thicker plate, which edge maybe expensive to manufacture, a chamfered edge leading into or leading out of the orifice may be usefully employed to give a predictable characteristic at the cost of slight increase in viscosity sensitivity.

Where the concentrate valve is adjustable to provide a range of concentrate flow rates, the controller may be programmed to provide a "profiled" dispense for the beverage. In other words, the initial portion of the dispense may, for example, be at a low flow rate, e.g. to prevent initial over-foaming of a carbonate beverage, and then the rate may be increased to fall for the majority of the dispense period and then reduced to a slower rate again for the final filling of the glass or other receptacle. Thus the dispense pour may be controlled to suit the particular beverage in question.

As indicated above, the controller may be programmed to dispense a number of different beverages. It may also be programmed to dispense different volumes, e.g. a small portion and a large portion, of each beverage. The controller may also be programmed to take into account viscosity changes due to temperature variations. This can be achieved by the appropriate positioning of a temperature sensor in one or each fluid supply lines so that the correct ratios of fluids can be maintained regardless of temperature variations.

BRIEF DESCRIPTION OF THE DRAWINGS

A better understanding of the structure, function, objects and advantages of the of the present invention can be had by reference to the following detailed description with reference to the accompanying drawings, wherein.

DETAILED DESCRIPTION OF THE PREFERRED EMBODIMENTS

Figure 1:
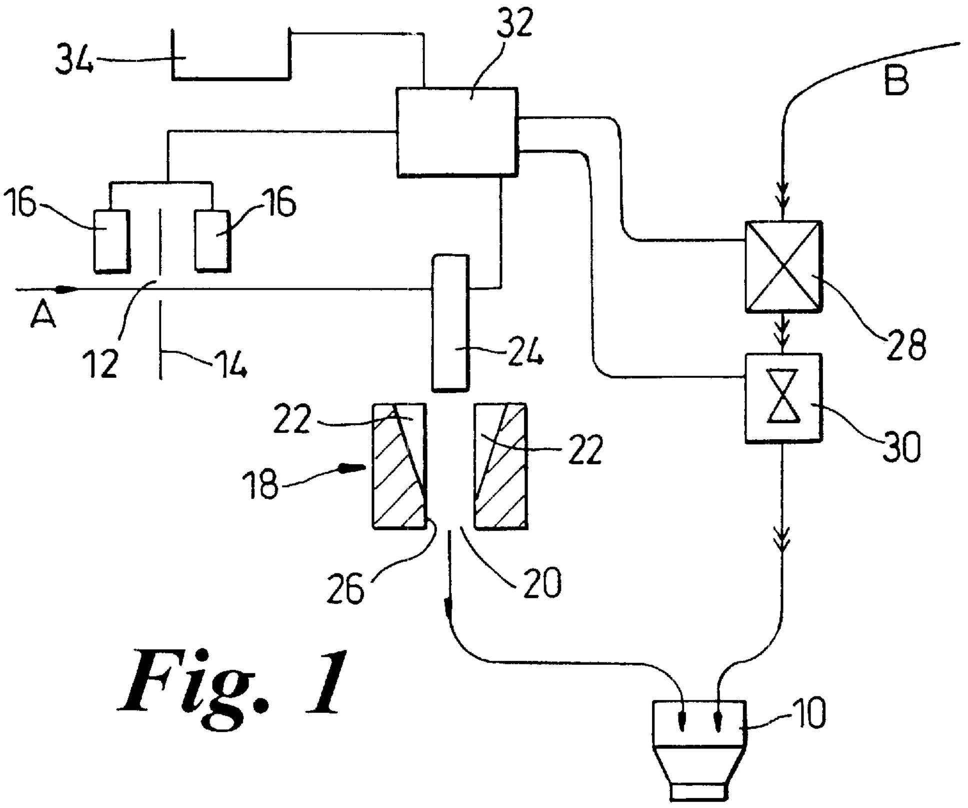
FIG. 1 is a diagrammatic representation of one apparatus of the invention.

As seen in FIG. 1, an apparatus for dispensing a post-mix beverage from a mixing/dispense head 10 is shown. A concentrate flow line A from a source of concentrate (not shown) is indicted by single-headed arrows. A diluent, e.g. carbonated water, flow line B, again from a source not shown, is indicated by double-headed arrows. Concentrate flow line A passes through the orifice 12 of an orifice plate 14 and the pressure drop across the plate is measured by pressure transducer 16. Between the orifice plate and the mixing head 10 is a variable on/off V-groove valve 18. Valve 18 has a through passageway 20 and a pair of opposed V-grooves 22 across the passageway, the cross-section of the grooves narrowing in the direction of flow of flow line A.

A piston 24 controlled by an actuator (not shown) completely closes passageway 20 in its fully lowered position by mating with internal walls 26 beyond the narrow end of grooves 22. As the piston is moved upwards, the valve 18 opens and the through flow of concentrate increases with increasing V-groove cross section until the fully open position illustrated is reached. Diluent flow line B passes through a regulating valve 28 and a flow turbine 30 to reach mixing head 10. A controller 32 receives signals from the pressure transducer 16 and from flow turbine 30. It is also connected to a control panel 34 via which a range of mixed beverages may be commanded. On receiving a command for a particular beverage, controller 32 opens valve 28 to allow flow of diluent and simultaneously, or marginally later, opens valve 18 by raising piston 24 to an appropriate degree. By monitoring the flow rate of concentrate through line A and adjusting the flow rate through line B accordingly, the controller ensures that the desired ratio of fluids for the commanded beverage is maintained. It may close the valves after a predetermined time or volume has been dispensed.

Figure 2:
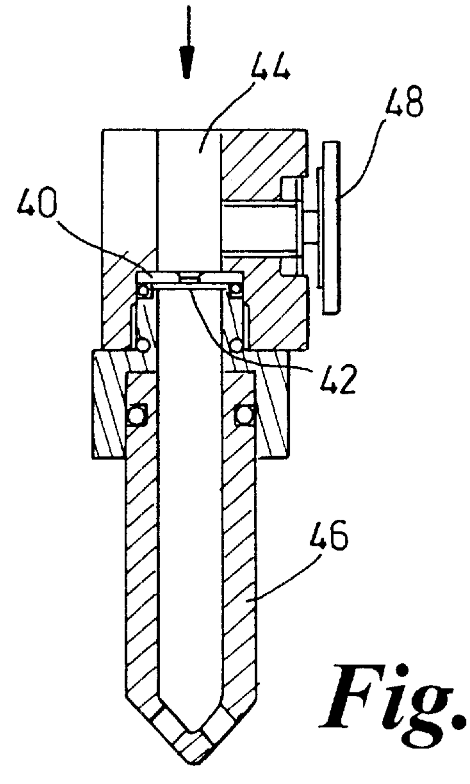
FIG. 2 is a part sectional view through a first orifice plate and pressure transducer arrangement for use in the invention.

In FIG. 2, there is shown one orifice plate/pressure transducer arrangement for the concentrate flow line. Direction of fluid flow is indicated by the arrows. An orifice plate 40 having a central orifice 42 is positioned across the flow line passage 44 immediately above an outlet nozzle 46 whereby the plate 40 vents to atmosphere. Hence the orifice plate here will be positioned downstream of the on/off valve for the concentrate. A pressure transducer 48 measures the fluid pressure immediately above plate 40 and by virtue of the venting to atmosphere can feed the pressure drop values across the plate to a suitable controller, such as controller 32 in FIG. 1.

Figure 3:
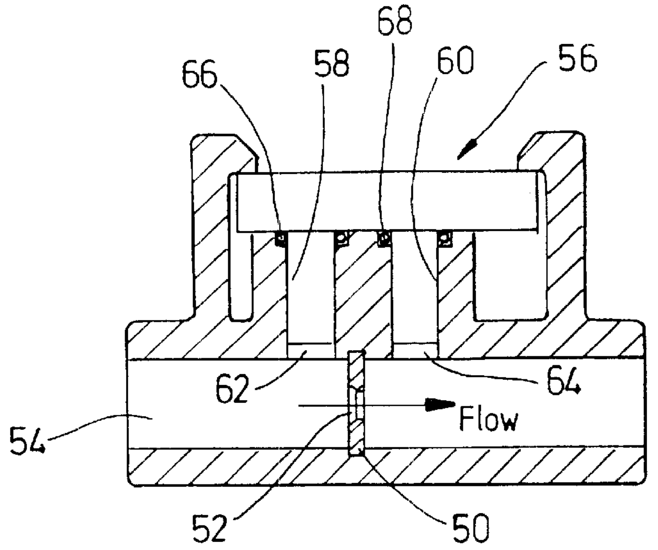
FIG. 3 is a sectional view of second orifice plate and pressure transducer arrangement for use in the invention.
Figure 4:
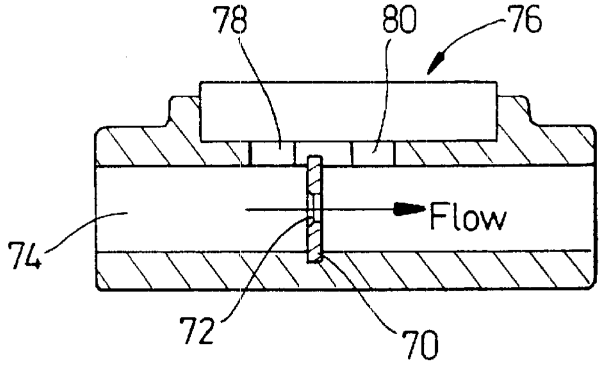
FIG. 4 is a sectional view of a third orifice plate and pressure transducer arrangement for use in the invention.

In FIG. 3, an orifice plate 50 having a central orifice 52 is moulded in-situ to lie across a portion 54 of second fluid flow line. A pressure transducer 56 reads the fluid pressure values immediately upstream and downstream of the plate 50 via stem tubes 58, 60 respectively. Stem tubes 58, 60 are a snap fit into orifices 62, 64 in the flow passageway and are sealed into position by their respective O-rings 66, 68. Again the pressure transducer feeds pressure data to a suitable controller, as described above. The pressure transducer with the attachment stem tubes as shown in FIG. 3 is a well known attachment means but is not essential. An alternative arrangement is shown in FIG. 4. Here orifice plate 70 with central aperture 72 is again moulded in-situ to lie across a portion 74 of the second fluid flow line. Again pressure transducer 76 reads the fluid pressure values immediately upstream and downstream of plate 70 but directly via orifices 78, 80 i.e. without the stem tubes of FIG. 3. Although flow through the orifice plates in FIGS. 3 and 4 is shown horizontal, as suggested above, it may be preferable for the flow to be uphill.

Figure 5:
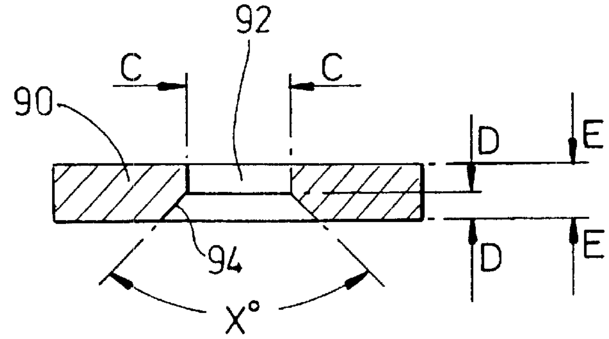
FIG. 5 is an enlarged sectional view of an orifice plate for use in the invention.

One suitable form of orifice plate 90 is shown in FIG. 5. It has a central orifice 92, which has a chamfered edge 94 on one side of the plate. As indicated above, the chamfer may be on the upstream or downstream side of the plate. By way of example only, the following dimensions may be found to be suitable where the diluent to concentrate ratio is 5 to 1 respectively and where the total flow rate of the two fluids is in the range of 1 and ½ to four ounces per second.

Plate thickness EE—about 1 mm.

Chamfer axial thickness DD—about 0.5 mm.

Orifice diameter CC—about 1.4 mm to 1.9 mm.

Chamfer angle $x^0$=90°.

Pressure change at maximum concentrate flow rate between 10–30 p.s.i.

In the claims:

1. A dispensing valve for mixing therein and dispensing there from a first fluid and a second fluid at a predefined ratio, comprising:

a dispensing valve body having a first inlet and a second inlet for providing connection to pressurized sources of the first fluid and the second fluid respectively, the first inlet delivering the first fluid to a first channel, the first channel having a pressure based flow sensing means, the second inlet delivering the second fluid to a second channel and the second channel having a second fluid flow sensing means therein for sensing the flow rate of the second fluid there through, and the second flow sensing means and the pressure based flow sensing means connected to a microcontroller for determining the flow rates of the second and first fluids respectively, a valve in the first channel and operated by the microcontroller for regulating the flow of the first fluid there thorough in an on/off manner, a linear actuator controlled by the microcontroller for operating a rod extending in the second channel, the rod having a rod end movable to a stop position for stopping the flow of the second fluid and to a full flow position for permitting a maximum flow of the second liquid and movable to a plurality of positions between the stop and full open positions for regulating the flow rate of the second fluid as a function of the size of a flow orifice created between the rod and the second channel relative to the position of the rod end between the stop and full flow positions, and the microcontroller regulating the flow rate of the second fluid as a function of the sensed flow rate of the first fluid so as to maintain the predetermined ratio there between.

2. The dispensing valve as defined in claim 1, and where the first fluid is a syrup concentrate and the second fluid is a water diluent.

3. The dispensing valve as defined in claim 1, and the pressure based flow sensing means including an orifice plate in the first channel and extending therein transverse to the flow of the first fluid there through and the orifice plate having two side surfaces and a central hole there through and the central hole having a chamfered edge around a perimeter thereof formed into a portion of one of the side surfaces.

4. The dispensing valve as defined in claim 2, and the pressure based flow sensing means including an orifice plate in the first channel and extending therein transverse to the flow of the first fluid there through and the orifice plate having two side surfaces and a central hole there through and the central hole having a chamfered edge around a perimeter thereof formed into a portion of one of the side surfaces.

* * * * *